(12) United States Patent
Schondorf et al.

(10) Patent No.: US 11,066,014 B1
(45) Date of Patent: Jul. 20, 2021

(54) 360 DEGREE TRAILER CAMERA VIEW SYSTEM

(71) Applicant: Ford Global Technologies, LLC, Dearborn, MI (US)

(72) Inventors: Steven Schondorf, Dearborn, MI (US); Aaron Bresky, St. Clair Shores, MI (US); Ali Nizar Yassine, Dearborn Heights, MI (US); Matthew Flis, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/741,170

(22) Filed: Jan. 13, 2020

(51) Int. Cl.
| | |
|---|---|
| *B60R 1/00* | (2006.01) |
| *H04N 5/247* | (2006.01) |
| *H04N 5/265* | (2006.01) |
| *H04N 7/08* | (2006.01) |
| *H04N 21/47* | (2011.01) |
| *H04N 21/431* | (2011.01) |
| *B60R 16/02* | (2006.01) |
| *B60D 1/62* | (2006.01) |

(52) U.S. Cl.
CPC ............. *B60R 1/002* (2013.01); *H04N 5/247* (2013.01); *H04N 5/265* (2013.01); *H04N 7/0806* (2013.01); *H04N 21/4316* (2013.01); *H04N 21/47* (2013.01); *B60D 1/62* (2013.01); *B60R 16/0207* (2013.01); *B60R 2300/102* (2013.01); *B60R 2300/105* (2013.01); *B60R 2300/20* (2013.01); *B60R 2300/303* (2013.01); *B60R 2300/607* (2013.01); *B60R 2300/80* (2013.01)

(58) Field of Classification Search
CPC ................ B60R 1/002; B60R 16/0207; B60R 2300/303; B60R 2300/105; B60R 2300/102; B60R 2300/80; B60R 2300/607; B60R 2300/20; H04N 21/47; H04N 21/4316; H04N 5/247; H04N 7/0806; H04N 5/265; B60D 1/62
See application file for complete search history.

(56) References Cited

U.S. PATENT DOCUMENTS

| | | | |
|---|---|---|---|
| 2015/0116495 A1* | 4/2015 | Kowatari | ................. B60P 1/04 348/148 |
| 2016/0052453 A1* | 2/2016 | Nalepka | .................. H04N 5/44 348/148 |
| 2019/0064831 A1* | 2/2019 | Gali | ...................... B60W 10/18 |

* cited by examiner

*Primary Examiner* — James M Pontius
(74) *Attorney, Agent, or Firm* — Frank Lollo; Eversheds Sutherland (US) LLP

(57) ABSTRACT

Systems and methods for receiving a video feed from a trailer control module disposed in a vehicle trailer are described. One method includes aggregating a trailer front view, a trailer rear view, a trailer left view, and a trailer right view into an aggregated birds-eye view at a first control module disposed on the trailer, and sending the aggregated view to a vehicle towing the trailer via a single auxiliary video channel integrated into a trailer hitch wiring harness. The method further includes receiving the feed of the birds-eye view at the second control module disposed in the vehicle via the single auxiliary camera input channel, and displaying the trailer birds-eye view video feed at an output display disposed in a cabin of the towing vehicle. The birds-eye view may be output on a split screen in conjunction with a rear-view of the trailer, obtained from a vehicle camera system.

20 Claims, 5 Drawing Sheets

360 DEGREE TRAILER CAMERA VIEW SYSTEM

TECHNICAL FIELD

The present disclosure relates to a vehicle interface system for a vehicle, and more particularly, to an assisted trailer maneuvering system for improved visibility while maneuvering a trailer.

BACKGROUND

Operating a vehicle with a trailer in tow can be challenging for many drivers. This is particularly true for drivers that are unskilled at backing up vehicles with attached trailers, which may include those that drive with a trailer on an infrequent basis (e.g., have rented a trailer, use a personal trailer on an infrequent basis, etc.). Trailer backup assist systems for vehicles may include an onboard user interface that allows the user to steer a trailer towed by the vehicle through an automated steering controller that provides the steering motion that moves the trailer along a user-defined path curvature.

Some vehicles include a 360-degree camera system having processing capability to combine multiple camera angles into an aggregated birds-eye view of the vehicle. Although not currently offered for trailer backup assist systems, a birds-eye view of the trailer may further assist the vehicle driver to perform trailer backup operations.

Conventional backup assistance systems, which do not provide simplified ways to transmit video signals from cameras onboard the trailer to the vehicle towing the trailer may be impractical, as the required video channel connectors may be costly and wear out quickly, in addition to the time and effort needed to make multiple connections for the video feeds each time the trailer is hitched and unhitched to the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Systems and methods for receiving a video feed from a trailer control module disposed in a vehicle trailer are described. For example a first control module disposed onboard the trailer may aggregate a trailer front view, a trailer rear view, a trailer left view, and a trailer right view, into a birds-eye view. The trailer broadcasts the aggregated birds-eye view of the trailer to a vehicle towing the trailer via a single auxiliary video input channel that is integrated into a trailer hitch wiring harness of the trailer being towed. The trailer wiring harness connects the trailer with the vehicle to extend control of standard driving functions such as trailer braking and signal lights, and includes the video input channel.

The birds-eye view of the trailer may be received via a second control module in the vehicle, and the trailer birds-eye view video feed of the trailer may be output at an output display disposed in a cabin of the towing vehicle. The birds-eye view may be displayed in various ways, such as a split screen that depicts the trailer birds-eye view in conjunction with a rear-view of the vehicle, or with other views obtained from a vehicle camera system.

Embodiments described herein can provide a way to integrate a trailer birds-eye view video feed with a rear view of the towing vehicle, utilizing the towing vehicle's existing onboard wiring hardware and control modules, without the need to add additional wiring connections. The disclosed methods and system may be useful in a trailer reverse system that can assist drivers in operating a vehicle towing a trailer, such as a box trailer or a recreational vehicle (RV) or the like, in reverse gear without a spotter to help the driver, and without adding additional wiring connections or an upgraded onboard control module to the towing vehicle.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
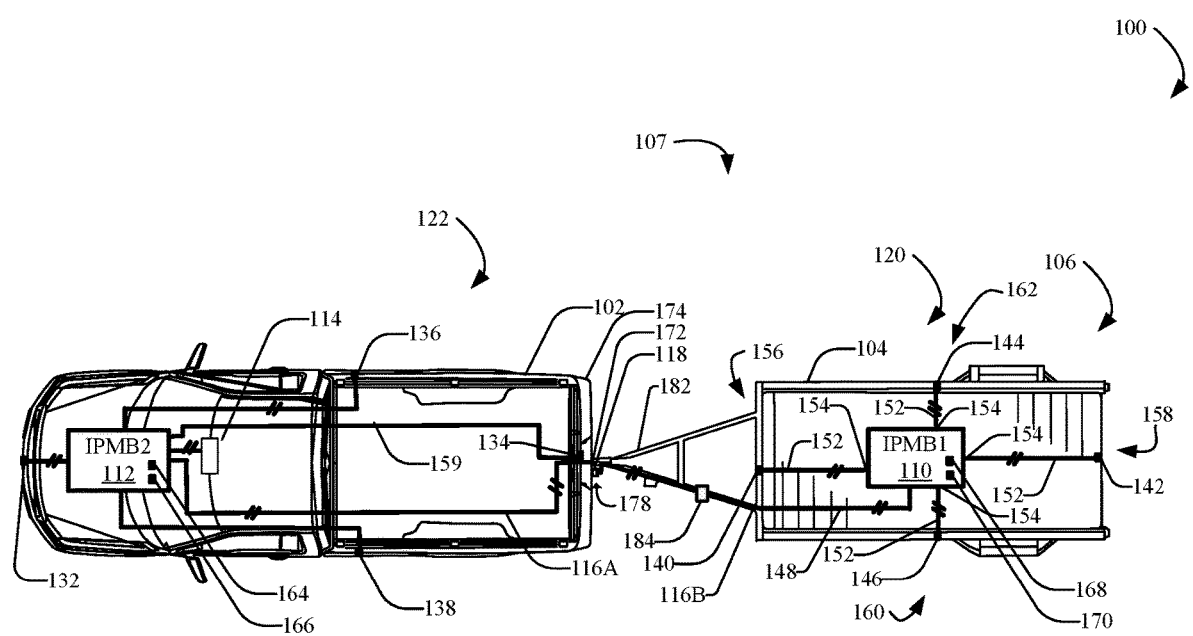
FIG. 1 depicts an example trailer backup assist system according to embodiments of the present disclosure.

FIG. 1 depicts an example trailer backup assist system 100, according to embodiments of the present disclosure. The backup assist system 100 may be utilized for controlling a back-up path of a trailer 104 attached to a vehicle 102 by allowing a driver of the vehicle 102 to specify a desired curvature of the backing path of the trailer 104. The trailer assist system 100 may include a first control module 110, and a second control module 112. The first control module 110 may be rigidly disposed onboard the trailer 104, and the second control module 112 may be disposed onboard the vehicle 102. The first and second control modules 110 and 112 are depicted in FIG. 1 as controllers running an Intelligent Platform Management Bus (IPMB) Communications Protocol. Other protocols are possible, and contemplated.

The backup assist system 100 may further include an output display device 114 disposed in communication with the second control module 112 onboard the vehicle. The first control module 110 onboard the trailer may be disposed in communication with the second control module 112 via an auxiliary camera input channel 116, through a towing wire harness 118. The first control module 110 may generate a birds-eye view video feed 184 through a single auxiliary input channel 148 connected through the towing wire harness 118. More particularly, the towing wire harness 118 connects a vehicle portion 116A of the single auxiliary camera input channel 148 and a trailer portion 116B of the single auxiliary camera input channel 116. The vehicle portion 116A may connect with the trailer portion 116B (and vice versa) through a towing wire harness 118. The single auxiliary camera input channel 148 is described as "single" in that it utilizes a single channel connector disposed in the wire harness 118.

The trailer assist system 100 may further include a plurality of trailer cameras 120 that can include a trailer front camera 140, a trailer rear camera 142, a trailer left camera 146, and a trailer right camera 144 disposed in communication with the first control module 110. The first control module 110 may receive respective video feeds from the trailer cameras 140-146, generate the trailer birds-eye view video feed 184 based from the video feeds from respective cameras 140-146, and transmit a single video signal via the single auxiliary camera input channel 148.

The trailer assist system 100 may further include one or more 360-degree view cameras among a plurality of possible vehicle cameras 132-138. The plurality of trailer cameras 140-146 may be disposed, respectively, on a trailer front portion 156, a trailer rear portion 158, a trailer left portion 160, and a trailer right portion 162, among other possible locations.

Although some embodiments may only include a vehicle rear camera 134, in one embodiment, a plurality of vehicle cameras 132-138 may include a front camera 132 providing a front view of the vehicle 102, a vehicle rear camera 134 may provide a rear view of the vehicle (including, for example the trailer 104), a left camera 138 may provide a left view of the vehicle 102, and a right camera 136 may provide a right view of the vehicle 102. The cameras 132-138 may be disposed in communication with the second control module 112 of the vehicle via a plurality of camera connectors connecting the vehicle cameras 132-138 via the connection wires 159.

Similarly, the plurality of trailer cameras 140-146 may include a trailer front camera 140 providing a front view of the trailer 104 (and thus, a view of the rear portion of the vehicle 102 from the trailer's perspective), a rear camera 142 providing a rear view of the trailer 104, a trailer right camera 144 providing a right view of the trailer 104, and a trailer left camera 146 providing a left view of the trailer 104.

The second control module 112, disposed on the vehicle 102, may include a processor 164 and a computer-readable memory 166. Details regarding the processor 164 and memory 166 are discussed hereafter with respect to an automotive computer 245 in FIG. 2. Further, the automotive computer 245 is an example computing platform that can include or represent the second control module 112. It should be appreciated that the first control module 110 may include similar features with respect to the second control module 112, and in fact, may be substantially similar or identical to the second control module 112. The first control module 110 may include, for example, a processor 168 and a computer-readable memory 170, and may be connected to a power bus (not shown in FIG. 1) available via the wire harness 182.

The trailer backup assist system 100 may be configured to automatically or manually steer the vehicle 102 to guide the trailer 104 on the desired curvature or back-up path as a driver uses the accelerator and brake pedals (not shown in FIG. 1) to control the reversing speed of the vehicle 102. To monitor the position of the trailer 104 behind the vehicle 102, the trailer backup assist system 100 may include a sensor system that senses or otherwise determines a hitch angle between the trailer 104 and the vehicle 102. In one embodiment, the sensor system 106 may include a trailer sensor module (not show in FIG. 1) attached to the trailer 104 that monitors the dynamics of the trailer 104, such as a yaw rate, and communicates with the first control module 110 disposed onboard the trailer. The trailer backup assist system 100, according to such an embodiment, may also include a vehicle sensor system that generates information used for navigation such as, for example, a vehicle yaw rate and a vehicle speed.

With reference to the embodiment shown in FIG. 1, the vehicle 102 is a pickup truck equipped with the trailer backup assist system 100 for controlling the back-up path of the trailer 104 that is attached to the vehicle 102. Specifically, the vehicle 102 is pivotally attachable to the trailer 104 via a tongue 172 longitudinally extending forward from or proximate to the vehicle rear bumper 174. The illustrated trailer 104 is depicted in FIG. 1 as being hitched to the vehicle 102 via a trailer hitch 178, which may include a coupler assembly having a hitch ball (not shown in FIG. 1). The coupler assembly may be latchable onto the hitch ball to provide a pivoting ball joint connection that allows for articulation of the hitch angle. It should be appreciated that it is possible and contemplated that additional embodiments of the trailer 104 may alternatively couple with the vehicle 102 to provide a pivoting connection, such as by connecting with a fifth wheel connector (referred to herein as the wire harness 182). It is also contemplated that additional embodiments of the trailer may include more than one axle and may have various shapes and sizes configured for different loads and items, such as a boat trailer or a flatbed trailer.

The first control module 110 may receive a set of video feeds that can include a trailer front view, which may be received from the trailer front camera 140, a trailer rear view received from a rear camera 142, a trailer right view received from the trailer right camera 144, and a trailer left view received from the left camera 146. Additional or fewer cameras may be used to capture the various views. For example, two cameras may be capable of seeing all sides of the trailer. The first control module 110 may generate the trailer birds-eye view video feed 184 based on the set of video feeds received from the plurality of cameras 140-146. The first control module 110 may send the trailer birds-eye view video feed 184 to the second control module 112 disposed onboard the vehicle 102, via an auxiliary camera input channel associated with the trailer wire harness 182. This image video data may be sent via the single channel as a video feed to any device listening for such a signal via the wire harness. Stated another way, the first control module 110 may generate the birds-eye view video feed and broadcast it on the trailer portion of the vehicle portion of the auxiliary input channel 116A. When disposed in communication with the trailer 104, the second control module 112 may receive the trailer birds-eye view video feed 184 via the vehicle portion of the auxiliary camera input channel 116A, and display the feed on an output display (not shown in FIG. 1). The birds-eye view video feed 184 can be received and displayed by the vehicle 102 without the need for additional video feed connections between the vehicle 102 and the trailer 104. When triggered on a vehicle infotainment system or other output device, the vehicle 102 may display the birds-eye view video feed 184.

Figure 2:
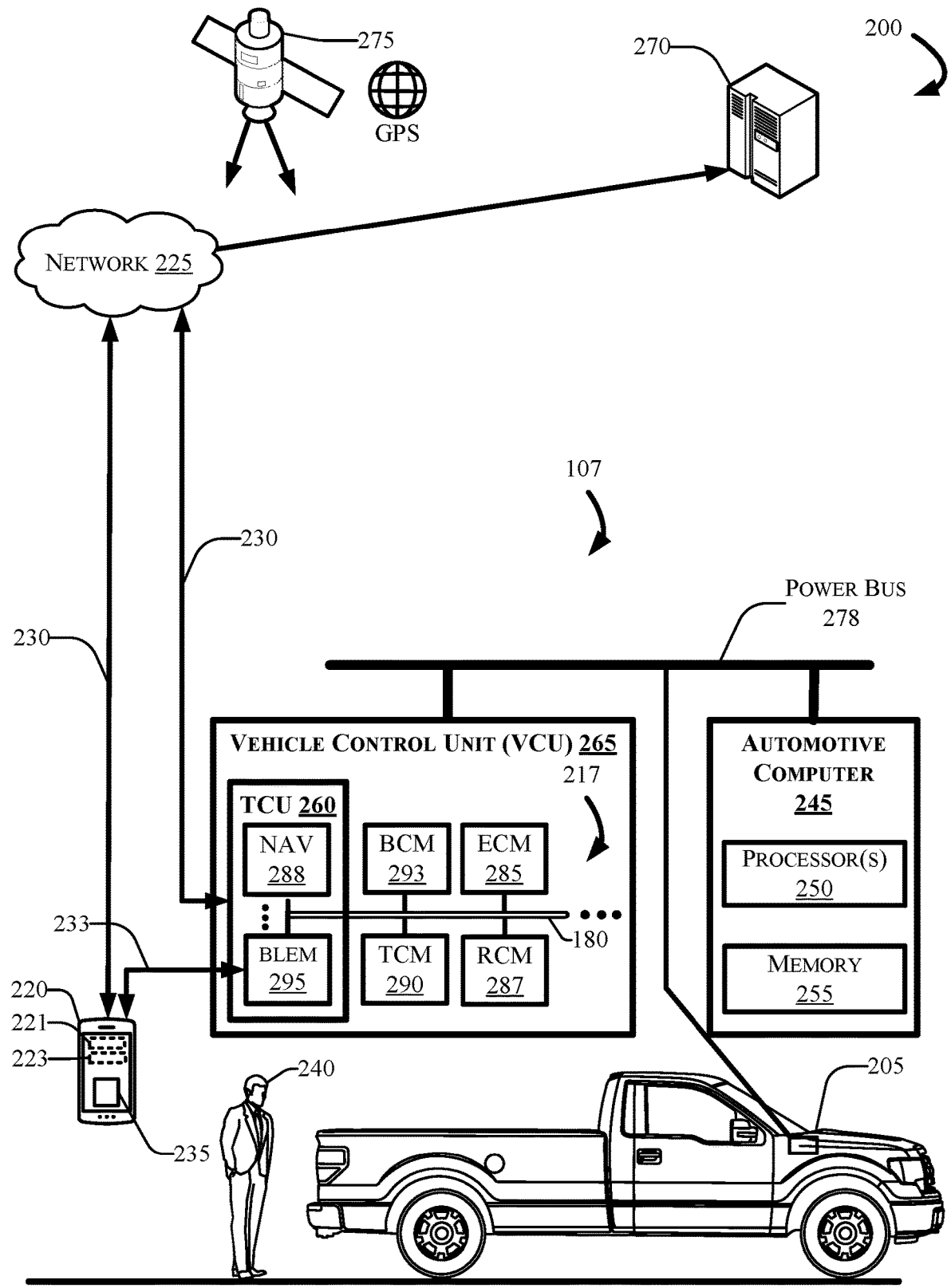
FIG. 2 depicts an example computing environment in which techniques and structures for providing the systems and methods disclosed herein may be implemented.

FIG. 2 depicts an example computing environment 200 that can include a vehicle 205 comprising the automotive computer 245, and a Vehicle Controls Unit (VCU) 265 that typically includes a plurality of electronic control units (ECUs) 217 disposed in communication with the automotive computer 245 and backup assist system 100 as shown in FIG. 1. A mobile device 220, which may be associated with a user 240 and the vehicle 205, may connect with the automotive computer 245 using wired and/or wireless communication protocols and transceivers. The mobile device 220 may be communicatively coupled with the vehicle 205 via one or more network(s) 225, which may communicate via one or more wireless channel(s) 230, and/or may connect with the vehicle 205 directly using near field communication (NFC) protocols, Bluetooth® protocols, Wi-Fi, Ultra-Wide Band (UWB), and other possible data connection and sharing techniques. The vehicle 205 may also receive and/or be in communication with a Global Positioning System (GPS) 275. In one embodiment, the mobile device 220 may be functional as an output display that functions similar to the output display depicted in FIGS. 3 and 4, discussed hereafter.

The automotive computer 245 may be or include an electronic vehicle controller, having one or more processor(s) 250 and memory 255. The second control module 112 may be one such example. The automotive computer 245 may, in some example embodiments, be disposed in communication with the mobile device 220, and one or more server(s) 270. The server(s) 270 may be part of a cloud-based computing infrastructure, and may be associated with and/or include a Telematics Service Delivery Network (SDN) that provides digital data services to the vehicle 205 and other vehicles (not shown in FIG. 2) that may be part of a vehicle fleet.

Although illustrated as a pickup truck, the vehicle 205 may take the form of another passenger or commercial automobile such as, for example, a car, a crossover vehicle, a sport utility, a van, a minivan, a taxi, a bus, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 205 may be configured as an electric vehicle (EV). More particularly, the vehicle 205 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 205 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 205 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Parking assist systems may be included as one such Level-1 autonomous system. Adaptive cruise control is another example of a Level-1 autonomous system, that can include aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. The backup assist system 107 may further include Level-3 autonomy features. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According to embodiments of the present disclosure, the backup assist system 107 may be configured to operate with a vehicle having a Level-1 through Level-4 autonomous vehicle controller (not shown in FIG. 2).

The mobile device 220 generally includes a memory 223 for storing program instructions associated with an application 235 that, when executed by a mobile device processor 221, performs aspects of the disclosed embodiments. The application (or "app") 235 may be part of the backup assist system 107, or may provide information to and/or receive information from the backup assist system 107.

In some aspects, the mobile device 220 may communicate with the vehicle 205 through the one or more channel(s) 230, which may be encrypted and established between the mobile device 220 and a Telematics Control Unit (TCU) 260. The mobile device 220 may communicate with the TCU 260 using a wireless transmitter (not shown in FIG. 2) associated with the TCU 260 on the vehicle 205. The transmitter may communicate with the mobile device 220 using a wireless communication network such as, for example, the one or more network(s) 225. The wireless channel(s) 230 are depicted in FIG. 2 as communicating via the one or more network(s) 225, and via one or more direct connection(s) 233. The connection(s) 233 may include various low-energy protocols including, for example, Bluetooth®, BLE, or other Near Field Communication (NFC) protocols.

The network(s) 225 illustrate an example of an example communication infrastructure in which the connected devices discussed in various embodiments of this disclosure may communicate. The network(s) 225 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 245 may be installed in an engine compartment of the vehicle 205 (or elsewhere in the vehicle 205) and operate as a functional part of the backup assist system 107, in accordance with the disclosure. The automotive computer 245 may include one or more processor(s) 250 and a computer-readable memory 255.

The one or more processor(s) 250 may be disposed in communication with one or more memory devices disposed in communication with the respective computing systems (e.g., the memory 255 and/or one or more external databases not shown in FIG. 2). The processor(s) 250 may utilize the memory 255 to store programs in code and/or to store data for performing aspects in accordance with the disclosure. The memory 255 may be a non-transitory computer-readable memory. The memory 255 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 265 may share a power bus 278, and may be configured to coordinate the data between vehicle 205 systems, connected servers (e.g., the server(s) 270), and other vehicles (not shown in FIG. 2) operating as part of a vehicle fleet. The VCU 265 can include or communicate with any combination of the ECUs 217, such as, for example, a Body Control Module (BCM) 293, an Engine Control Module (ECM) 285, a Transmission Control Module (TCM) 290, the TCU 260, a Restraint Control Module (RCM) 287, etc. In some aspects, the VCU 265 may control aspects of the vehicle 205, and implement one or more instruction sets received from the application 235 operating on the mobile device 220, from one or more instruction sets received from the backup assist system 107, and/or from instructions received from an AV controller (not shown in FIG. 2).

The TCU 260 can be configured to provide vehicle connectivity to wireless computing systems onboard and offboard the vehicle 205, and may include a Navigation (NAV) receiver 288 for receiving and processing a GPS signal from the GPS 275, a Bluetooth® Low-Energy (BLE) Module (BLEM) 295, a Wi-Fi transceiver, an Ultra-Wide Band (UWB) transceiver, and/or other wireless transceivers (not shown in FIG. 2) that may be configurable for wireless communication between the vehicle 205 and other systems, computers, and modules. The TCU 260 may be disposed in communication with the ECUs 217 by way of a bus 180. In some aspects, the TCU 260 may retrieve data and send data as a node in a CAN bus.

The BLEM 295 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 295 may include Generic Attribute Profile (GATT) device connectivity for client devices that respond to or initiate GATT commands and requests, and connect directly with the mobile device 220.

The bus 180 may be configured as a Controller Area Network (CAN) bus organized with a multi-master serial bus standard for connecting two or more of the ECUs 217 as nodes using a message-based protocol that can be configured and/or programmed to allow the ECUs 217 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 217 may communicate with a host computer (e.g., the automotive computer 245, the backup assist system 107, and/or the server(s) 270, etc.), and may also communicate with one another without the necessity of a host computer. The bus 180 may connect the ECUs 217 with the automotive computer 245 such that the automotive computer 245 may retrieve information from, send information to, and otherwise interact with the ECUs 217 to perform steps described according to embodiments of the present disclosure. The bus 180 may connect CAN bus nodes (e.g., the ECUs 217) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 265 may control various loads directly via the bus 180 communication or implement such control in conjunction with the BCM 293. The ECUs 217 described with respect to the VCU 265 are provided for exemplary purposes only, and are not intended to be limiting or exclusive. Control and/or communication with other control modules not shown in FIG. 2 is possible, and such control is contemplated.

In an example embodiment, the ECUs 217 may control aspects of vehicle operation and communication using inputs from human drivers, inputs from an autonomous vehicle controller, the backup assist system 107, and/or via wireless signal inputs received via the wireless channel(s) 233 from other connected devices such as the mobile device 220, among others. The ECUs 217, when configured as nodes in the bus 180, may each include a central processing unit (CPU), a CAN controller, and/or a transceiver (not shown in FIG. 2). For example, although the mobile device 220 is depicted in FIG. 2 as connecting to the vehicle 205 via the BLEM 295, it is possible and contemplated that the wireless connection 233 may also or alternatively be established between the mobile device 220 and one or more of the ECUs 217 via the respective transceiver(s) associated with the module(s).

The BCM 293 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 293 may also operate as a gateway for bus and network interfaces to interact with remote ECUs (not shown in FIG. 2).

The BCM 293 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 293 may be configured for vehicle energy management, exterior lighting control, wiper functionality, power window and door functionality, heating ventilation and air conditioning systems, and driver integration systems. In other aspects, the BCM 293 may control auxiliary equipment functionality, and/or be responsible for integration of such functionality.

The computing system architecture of the automotive computer 245, VCU 265, and/or the backup assist system 107 may omit certain computing modules. It should be readily understood that the computing environment depicted in FIG. 2 is one example of a possible implementation according to the present disclosure, and thus, it should not to be considered limiting or exclusive.

Figure 3:
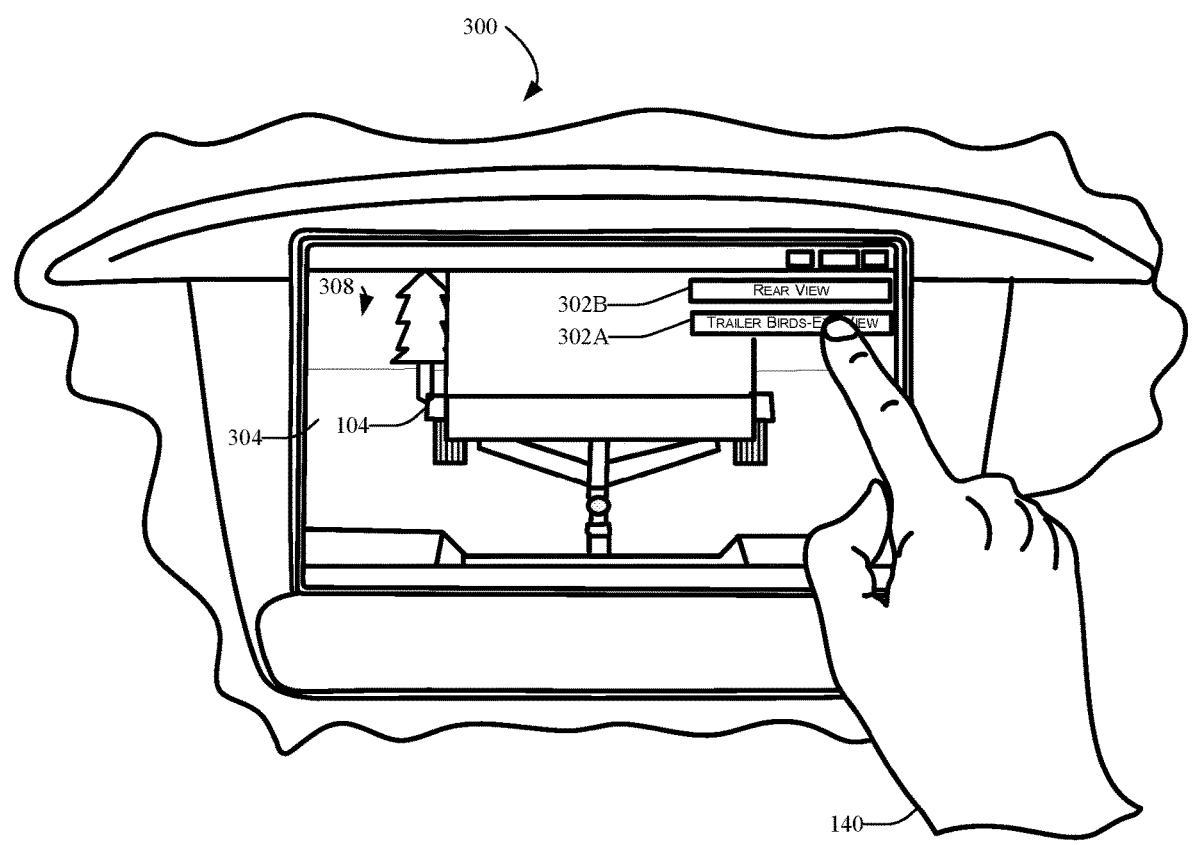
FIG. 3 is an example camera output display user interface in a vehicle according to embodiments of the present disclosure.

FIG. 3 depicts a rear view 308 of the trailer 104, as shown through an output display 304 of a vehicle infotainment system 300. The embodiment depicted in FIG. 3 can include the example output display 304 in a vehicle (e.g., the vehicle 102 as shown in FIG. 1), according to embodiments of the present disclosure. For example, the rear view 308, as depicted in FIG. 3, may be viewable via the vehicle infotainment system 300, or another output device in secure communication with the vehicle trailer 104. The user 140 may select a selectable icon or menu item (e.g., a selectable menu item 302A "Trailer Birds-Eye View", a selectable menu item 302B "Rear View Only", etc.) on the output display 300 to switch from a rear view of the vehicle 102, to a split screen showing both a rear view 308 of the trailer 104 and a birds-eye view display of the trailer 104. Other selectable icons (not shown in FIG. 3) may be presented for additional views, such as, for example, the birds-eye view only.

Figure 4:
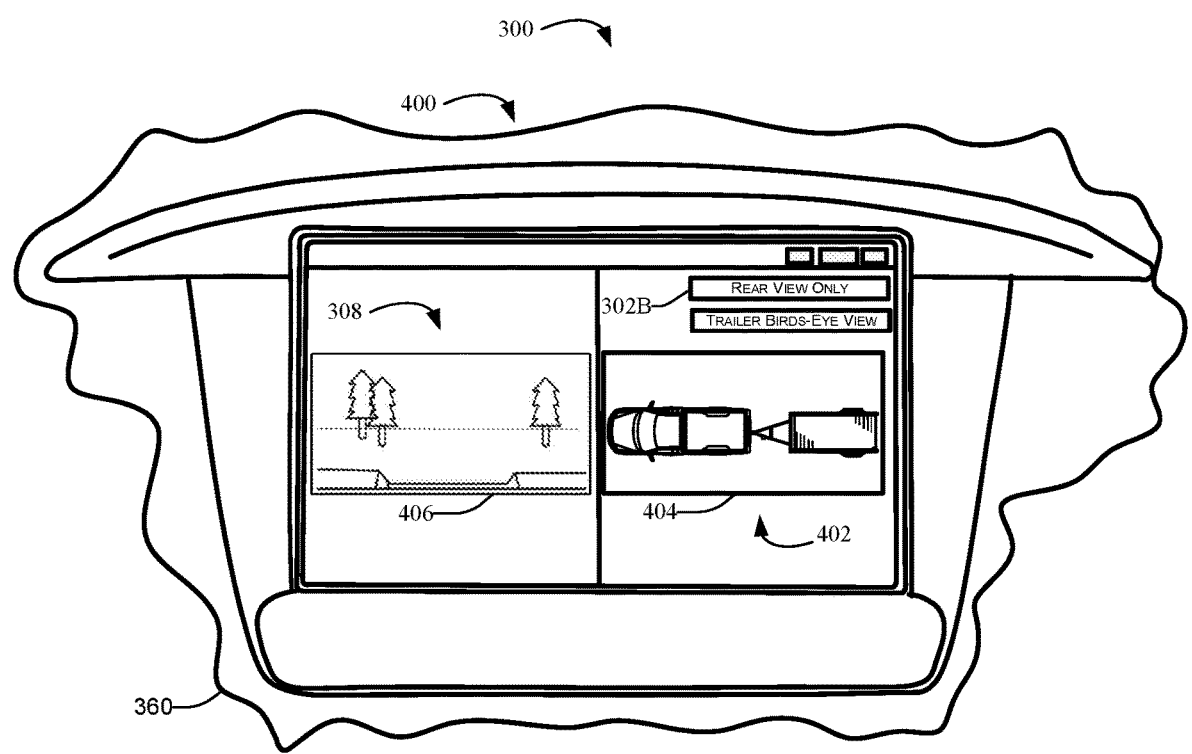
FIG. 4 depicts another view of the example output display of FIG. 3 according to embodiments of the present disclosure.

FIG. 4 depicts another view of the example output display according to embodiments of the present disclosure. More particularly, FIG. 4 depicts the vehicle infotainment system (or other output device) showing a split screen output 400. The split screen output 400 may include (among other possible views), a birds-eye view of the trailer 104 in a first split screen video portion 404 (which may include the trailer by itself in one embodiment, or the trailer and vehicle birds-eye view in the second embodiment depicted in FIG. 4), and the trailer rear view output in a second split screen portion 406.

Other views are also contemplated. For example, in one embodiment, the vehicle 102 (and more particularly, the second control module 112) may receive a plurality of video feeds, where the video feeds can include the rear-view 308, a towing vehicle left view, a towing vehicle right view, and a towing vehicle front view. Accordingly, the second control module 112 may generate a second birds-eye view of the vehicle 102, which may be another available view selectable via icons (not shown in FIG. 4).

Figure 5:
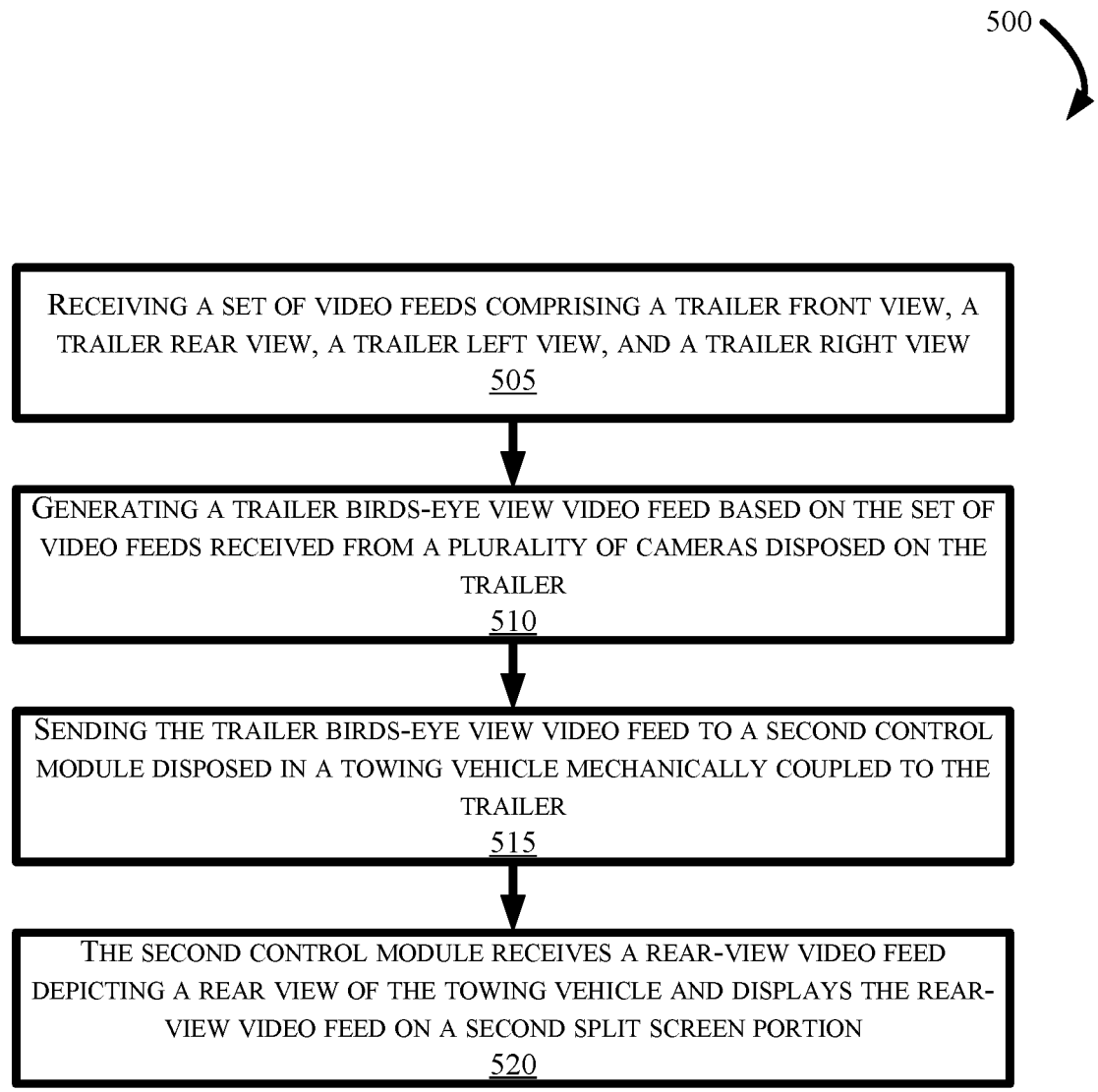
FIG. 5 depicts a flow diagram in accordance with the present disclosure.

FIG. 5 is a flow diagram of an example method 500 for generating a trailer birds-eye view video feed using a control module onboard a trailer being towed by a towing vehicle using a single auxiliary input channel, according to the present disclosure. The following process is exemplary and not confined to the steps described hereafter. Moreover, alternative embodiments may include more or less steps that are shown or described herein, and may include these steps in a different order than the order described in the following example embodiments.

Referring first to FIG. 5 at step 505, the method 500 may commence with receiving, at a first control module disposed on a trailer, a set of video feeds comprising a trailer front view, a trailer rear view, a trailer left view, and a trailer right view.

At step 510, the method can include a step for generating, via the first control module, a trailer birds-eye view video feed based on the set of video feeds received from a plurality of cameras disposed on the trailer.

At step 515, the method can include a step for sending, via a single auxiliary camera input channel, the trailer birds-eye view video feed to a second control module disposed in a towing vehicle mechanically coupled to the trailer, wherein the trailer birds-eye view video feed is displayable via an output display associated with the towing vehicle. The first control module may send the trailer birds-eye view video feed to the second control module via an auxiliary camera input channel associated with a trailer wire harness. In one embodiment, the single auxiliary camera input channel consists of a single channel connection at the trailer wire harness. At step 520, the second control module may receive a rear-view video feed depicting a rear view of the towing vehicle, via the output display, the trailer birds-eye view video feed on a first split screen portion, and display the rear-view video feed on a second split screen portion.

In an example embodiment, this step may further include combining, via the second control module, a combined birds-eye view video feed showing a birds-eye view of the towing vehicle and the trailer; and displaying, via the output display, the combined birds-eye view video feed via the output display.

Embodiments described herein can provide ways to integrate a trailer birds-eye view video feed with existing wiring hardware and control modules onboard a towing vehicle without the need to add additional wiring connections. The disclosed methods and system may be useful because they provide a better user experience that may wish to view the trailer at a birds-eye view similar to features in the towing vehicle, and without adding additional wiring connections or an upgraded control module onboard the towing vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, at a first control module disposed on a trailer, a plurality of video feeds from a plurality of cameras disposed on the trailer, the plurality of video feeds comprising a trailer front view, a trailer rear view, a trailer left view, and a trailer right view;
   generating, at the first control module, a singular trailer birds-eye view video feed based on the plurality of video feeds; and
   sending, via a single auxiliary camera input channel, a single video signal comprising the singular trailer birds-eye view video feed to a second control module disposed in a towing vehicle mechanically coupled to the trailer, wherein the singular trailer birds-eye view video feed is displayable in the towing vehicle via an output display disposed in the towing vehicle.

2. The method according to claim 1, further comprising:
   receiving, at the second control module disposed in the towing vehicle, a trailer rear-view video feed depicting a rear view of the towing vehicle;
   displaying, via the output display, the singular trailer birds-eye view video feed on a first split screen portion;
   displaying the trailer rear-view video feed on a second split screen portion; and
   displaying, via the output display, a selectable menu icon for a user to switch between the trailer rear-view video feed and the singular trailer birds-eye view video feed.

3. The method according to claim 2, further comprising sending the singular trailer birds-eye view video feed to the second control module via the single auxiliary camera input channel associated with a trailer wire harness.

4. The method according to claim 3, wherein the single auxiliary camera input channel consists of a single channel connection at the trailer wire harness.

5. The method according to claim 2, further comprising:
   receiving, via the second control module, a second plurality of video feeds associated with the towing vehicle, wherein the second plurality of video feeds comprises the singular towing vehicle rear-view video feed, a left view video feed, a right view video feed, and a front view video feed.

6. The method according to claim 5, further comprising:
   combining, via the second control module, a combined birds-eye view video feed showing a birds-eye view of the towing vehicle and the trailer;
   displaying, via the output display, the combined birds-eye view video feed via the output display; and
   displaying, via the output display, the selectable menu icon for the user to switch between the combined birds-eye view video feed, the trailer rear-view video feed and the singular trailer birds-eye view video feed.

7. A system, comprising:
   a first control module disposed in a trailer; and
   a first memory disposed in the first control module, storing executable instructions that cause the first control module to execute the executable instructions to:
      receive a plurality of video feeds comprising a trailer front view, a trailer rear view, a trailer left view, and a trailer right view;
      generate, at the first control module, a singular trailer birds-eye view video feed based on the plurality of video feeds received from a plurality of cameras disposed on the trailer;
      send a single video signal comprising the singular trailer birds-eye view video feed to a towing vehicle via a single auxiliary camera input channel.

8. The system according to claim 7, further comprising:
   a second control module disposed in the towing vehicle mechanically coupled to the trailer; and
   an output display disposed in communication with the second control module, wherein the second control module is further configured to execute the executable instructions to:
      receive, at the second control module, the singular trailer birds-eye view video feed via the single auxiliary camera input channel; and
      display the singular trailer birds-eye view video feed at the output display.

9. The system according to claim 8, further comprising a vehicle rear-view video feed that shows a rear-view of the towing vehicle, wherein the second control module is further configured to execute the executable instructions to:
   receive, at the output display, the vehicle rear-view video feed;
   output, via the output display, the singular trailer birds-eye view video feed on a first split screen portion;
   output, via the output display, the vehicle rear-view video feed on a second split screen portion; and output, via the output display, a selectable menu icon for a user to switch between the vehicle rear-view video feed and the singular trailer birds-eye view video feed.

10. The system according to claim 9, wherein the first control module is further configured to execute the executable instructions to:
send the singular trailer birds-eye view video feed to the second control module via the single auxiliary camera input channel associated with a trailer wire harness.

11. The system according to claim 10, wherein the single auxiliary camera input channel consists of a single channel connection at the trailer wire harness.

12. The system according to claim 11, wherein the second control module is further configured to execute the executable instructions to:
receive a second plurality of video feeds associated with the towing vehicle, wherein the second plurality of video feeds comprises a video feed of a towing vehicle front view, a towing vehicle rear view, a towing vehicle left view, and a towing vehicle right view.

13. The system according to claim 12, wherein the second control module is further configured to execute the executable instructions to:
combine, via the second control module, a video feed showing a singular birds-eye view of the rear of the towing vehicle and the trailer;
output, via the output display, the singular combined birds-eye view video feed via the output display; and
output, via the output display, the selectable menu icon for the user to switch between the singular combined birds-eye view video feed, the vehicle rear-view video feed, and the singular trailer birds-eye view video feed.

14. The system according to claim 13, wherein the second control module is further configured to execute the executable instructions to:
output, via the output display, the singular combined birds-eye view video feed on the first split screen portion; and
output, via the output display, the vehicle rear-view video feed on the second split screen portion.

15. A first non-transitory computer-readable storage medium in a first control module associated with a trailer, the first non-transitory computer-readable storage medium having instructions stored thereupon which, when executed by a first processor of the first control module:
receives, via the first processor, a plurality of video feeds comprising a trailer front view, a trailer rear view, a trailer left view, and a trailer right view;
generates, at the first processor, a singular trailer birds-eye view video feed based on the plurality of video feeds received from a plurality of cameras disposed on the trailer;
transmits a single video signal comprising the singular trailer birds-eye view video feed to a towing vehicle via a single auxiliary camera input channel.

16. The first non-transitory computer-readable storage medium according to claim 15, further comprising a second non-transitory computer-readable storage medium in a second control module disposed in the towing vehicle, the second non-transitory computer-readable storage medium having instructions stored thereupon which, when executed by a second processor:
receives the combined trailer birds-eye view video feed via the single auxiliary camera input channel; and
displays the combined trailer birds-eye view video feed at an output display.

17. The second non-transitory computer-readable storage medium according to claim 16, further comprising causing the second processor to:
send the combined trailer birds-eye view video feed to the second control module via the single auxiliary camera input channel associated with a trailer wire harness.

18. The second non-transitory computer-readable storage medium according to claim 17, wherein the single auxiliary camera input channel consists of a single channel connection via the trailer wire harness.

19. The second non-transitory computer-readable storage medium according to claim 17, further comprising causing the second processor to:
receive a second plurality of video feeds associated with the towing vehicle, wherein the second plurality of video feeds comprises a towing vehicle front view, a towing vehicle rear view, a towing vehicle left view, and a towing vehicle right view;
generate a singular combined birds-eye view video feed showing a birds-eye view of the rear of the towing vehicle and the trailer;
output, via the output display, the singular combined birds-eye view video feed; and
output, via the output display, a selectable menu icon for a user to switch between the singular combined birds-eye view video feed and the singular trailer birds-eye view video feed.

20. The second non-transitory computer-readable storage medium according to claim 19, further comprising causing the second processor to:
output, via the output display, the singular combined birds-eye view video feed on a first split screen portion; and
output, via the output display, a vehicle rear-view video feed on a second split screen portion.

* * * * *